(12) United States Patent
Yang et al.

(10) Patent No.: US 11,764,437 B2
(45) Date of Patent: *Sep. 19, 2023

(54) BATTERY, POWER CONSUMPTION APPARATUS, AND METHOD AND APPARATUS FOR PRODUCING BATTERY

(71) Applicant: CONTEMPORARY AMPEREX TECHNOLOGY CO., LIMITED, Ningde (CN)

(72) Inventors: Piaopiao Yang, Ningde (CN); Xiaobo Chen, Ningde (CN); Yao Li, Ningde (CN); Yujie Pu, Ningde (CN); Jinru Yue, Ningde (CN); Mingguang Gu, Ningde (CN); Lu Hu, Ningde (CN); Xianda Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,407

(22) Filed: Jun. 7, 2022

(65) Prior Publication Data

US 2022/0302551 A1  Sep. 22, 2022

Related U.S. Application Data

(63) Continuation of application No. 17/552,745, filed on Dec. 16, 2021, now Pat. No. 11,404,744, which is a (Continued)

(51) Int. Cl.
*H01M 50/375* (2021.01)
*H01M 50/209* (2021.01)
(Continued)

(52) U.S. Cl.
CPC ....... *H01M 50/375* (2021.01); *H01M 50/209* (2021.01); *H01M 50/3425* (2021.01); *H01M 50/35* (2021.01); *H01M 2220/20* (2013.01)

(58) Field of Classification Search
CPC .. H01M 50/30; H01M 50/375; H01M 50/342; H01M 50/209
See application file for complete search history.

(56) References Cited

U.S. PATENT DOCUMENTS

2013/0095356 A1  4/2013  Shimizu et al.
2019/0181419 A1  6/2019  Suba et al.
(Continued)

FOREIGN PATENT DOCUMENTS

CN  209401710 U  9/2019
CN  209561492 U  10/2019
(Continued)

OTHER PUBLICATIONS

Machine Translation of: JP 2006-185894 A, Nakano, Jul. 13, 2006.*
First Office Action dated Jun. 1, 2023 received in Chinese Patent Application No. CN 202180000846.3.

*Primary Examiner* — Kenneth J Douyette
(74) *Attorney, Agent, or Firm* — Scully, Scott, Murphy & Presser, P.C.

(57) ABSTRACT

Embodiments of the present application provide a battery, a power consumption apparatus, and a method and apparatus for producing a battery. The battery includes: a plurality of battery cells, the battery cell comprising a housing, the housing being configured to be actuated when an internal pressure or temperature of the housing reaches a threshold, to relieve the internal pressure of the housing; a plurality of first boxes, the first box being configured to accommodate at least one battery cell of the plurality of battery cells, the first box including a pressure relief region, and the pressure relief region being configured to relieve an internal pressure of the (Continued)

first box; and a second box, the second box being configured to accommodate the plurality of first boxes. According to the technical solutions of the embodiments of the present application, the safety of the battery can be enhanced.

20 Claims, 6 Drawing Sheets

Related U.S. Application Data continuation of application No. PCT/CN2021/080838, filed on Mar. 15, 2021.

(51) Int. Cl.
*H01M 50/35* (2021.01)
*H01M 50/342* (2021.01)

(56) References Cited

U.S. PATENT DOCUMENTS

| 2020/0350531 A1 | 11/2020 | Edwards et al. |
| 2022/0077540 A1 | 3/2022 | Wakabayashi et al. |

FOREIGN PATENT DOCUMENTS

| CN | 209804772 U | 12/2019 |
| CN | 209860037 U | 12/2019 |
| CN | 111584784 A | 8/2020 |
| CN | 211530010 U | 9/2020 |
| JP | 2006185894 A | 7/2006 |
| WO | 2020152992 A1 | 7/2020 |

\* cited by examiner

BATTERY, POWER CONSUMPTION APPARATUS, AND METHOD AND APPARATUS FOR PRODUCING BATTERY

CROSS-REFERENCE TO RELATED APPLICATIONS

This application is a continuation of U.S. patent application Ser. No. 17/552,745 filed on Dec. 16, 2021, which is a continuation of International Application No. PCT/CN2021/080838, filed on Mar. 15, 2021. The disclosure of which is hereby incorporated by reference in its entirety.

TECHNICAL FIELD

The present application relates to the field of battery technologies, and in particular, to a battery, a power consumption apparatus, and a method and apparatus for producing a battery.

BACKGROUND

Energy conservation and emission reduction are the key to the sustainable development of the automotive industry. In this case, electric vehicles have become an important component of the sustainable development of the automotive industry due to their advantages of energy conservation and environmental protection. For the electric vehicles, battery technology is an important factor for their development.

In the development of the battery technology, in addition to improving the performance of a battery, safety is also an issue that cannot be ignored. If the safety of the battery cannot be guaranteed, the battery will pose a huge threat to the life and property safety of passengers. How to enhance the safety of the battery is an urgent technical problem to be solved in the battery technology.

SUMMARY

Embodiments of the present application provide a battery, a power consumption apparatus, and a method and apparatus for producing a battery, which can enhance the safety of the battery.

In a first aspect, there is provided a battery, including: a plurality of battery cells, the battery cell comprising a housing, the housing being configured to be actuated when an internal pressure or temperature of the housing reaches a threshold, to relieve the internal pressure of the housing; a plurality of first boxes, the first box being configured to accommodate at least one battery cell of the plurality of battery cells, the first box including a pressure relief region, and the pressure relief region being configured to relieve an internal pressure of the first box; and a second box, the second box being configured to accommodate the plurality of first boxes.

According to the technical solution of an embodiment of the present application, the battery cell comprising a housing is accommodated in a first box provided with a pressure relief region, and a plurality of first boxes are disposed in a second box. Therefore, when a battery cell in a certain first box suffers from thermal runaway (after the thermal runaway occurs, an internal pressure and temperature of the battery cell will rise sharply), the housing of the battery cell will be actuated when the internal pressure or temperature of the battery cell reaches a threshold, to relieve the internal pressure of the battery cell to an inside of the first box. Since the first boxes are plural in number and are independent from each other, when a battery cell in a certain first box suffers from thermal runaway, the influence of emissions and heat generated on a battery cell in other first boxes will be greatly reduced, thereby improving the safety of the battery. In addition, the first box includes a pressure relief region, which can relieve the internal pressure of the first box, thereby preventing the first box from exploding after the battery cell suffers from thermal runaway, and further improving the safety of the battery.

In some embodiments, the second box includes an electrical chamber, a collection chamber and an isolation component, and the electrical chamber is configured to accommodate the plurality of first boxes, the collection chamber is configured to collect emissions from the first box, and the isolation component is configured to isolate the electrical chamber and the collection chamber, so that the electrical chamber and the collection chamber are disposed on both sides of the isolation component.

The isolation component is utilized to separate the electrical chamber for accommodating the first box and the collection chamber for collecting the emissions. When the housing of the battery cell in the first box is actuated, the emissions of the battery cell enter the collection chamber, so that the emissions do not enter or enter the electrical chamber in a small amount, thereby achieving separation of the emissions from the battery cell, reducing the influence of the emissions of the battery cell (the emissions contain gases, combustibles, metal chips and other substances) on an electrical connection component, preventing the emissions of the battery cell from causing a short circuit between the battery cells, and thus enhancing the safety of the battery.

In some embodiments, the pressure relief region faces the isolation component.

Since the pressure relief region faces the isolation component, the emissions relieved from the pressure relief region can directly rush to the isolation component, thereby making it easier for the emissions to enter the collection chamber, and reducing the possibility of the emissions entering the electrical chamber.

In some embodiments, the first box is a covering with an opening, and the opening forms the pressure relief region.

Since the opening forms the pressure relief region, the internal pressure in the first box can be relieved through the opening, thereby preventing the first box from exploding, and improving the safety performance of the battery.

In some embodiments, the isolation component covers the opening.

By covering the opening of the first box by the isolation component, substances in the collection chamber can be blocked from entering the electrical chamber.

In some embodiments, the first box has a cavity for accommodating the battery cell, the pressure relief region is a first weakened zone of the first box, and the first weakened zone is configured to be actuated when an internal pressure or temperature of the cavity reaches a threshold, to relieve the internal pressure of the cavity.

The battery cell is accommodated in the first box, and the first weakened zone is disposed on the first box, and the first weakened zone is used as the pressure relief region. When an internal pressure or temperature of the first box reaches a threshold, the first weakened zone is actuated, and the internal pressure of the first box can be relieved through the pressure relief region, that is, emissions can be directed to be discharged out of the first box through the pressure relief region to prevent the first box from exploding. At the same time, when the battery is in a normal working state (the battery does not suffer from thermal runaway), the first weakened zone can prevent foreign objects (such as conductive substances) from entering the first box, which improves the safety performance of the battery.

In some embodiments, a thickness of the first weakened zone is smaller than a thickness of another region of a wall where the first weakened zone is located.

Since the thickness of the first weakened zone is smaller than the thickness of another region of the wall where the first weakened zone is located, the first weakened zone is easily damaged. At the same time, this way of forming the pressure relief region is simple and convenient.

In some embodiments, the thickness of the first weakened zone is 0.4 mm-3 mm.

Since the thickness of the first weakened zone is 0.4 mm-3 mm, it can be ensured that the first weakened zone will not be too thin to shorten service life, nor will it be too thick so that the first weakened zone needs to be actuated under high air pressure, that is, both the service life and the safety performance of the battery are taken into consideration.

In some embodiments, the first weakened zone has a lower melting point than another region of a wall where the first weakened zone is located.

Since the first weakened zone has a lower melting point than another region of the wall where the first weakened zone is located, the first weakened zone is easily damaged. As a result, when the temperature of the first weakened zone reaches the threshold, it can be actuated to relieve the internal pressure of the first box.

In some embodiments, a melting point of a material of the first weakened zone is lower than 600° C.

Since the melting point of the material of the first weakened zone is lower than 600° C., the first weakened zone can be damaged at a lower temperature, thereby relieving the internal pressure of the first box.

In some embodiments, the first box is provided with a first groove, and a bottom wall of the first groove is the first weakened zone.

By disposing the first groove on the first box, the bottom wall of the first groove is used as the first weakened zone, which is simple in implementation and low in cost.

In some embodiments, an opening of the first groove faces the battery cell.

By providing an opening on a side surface of the first box facing the battery cell to form the first groove, a larger gap can be provided between the bottom wall of the first groove and the battery cell, which facilitates the emissions of the battery cell to be discharged to the first groove.

In some embodiments, the isolation component is configured to accommodate a fluid to adjust a temperature of the battery cell.

By configuring the isolation component to accommodate the fluid to adjust the temperature of the battery cell, a purpose of utilizing the isolation component to heat or lower the temperature of the battery cell can be achieved, thereby adjusting the temperature of the battery cell.

In some embodiments, the isolation component is configured to be capable of being damaged when the pressure relief region relieves the internal pressure, so that the fluid is discharged from an inside of the isolation component.

When the pressure relief region relieves the internal pressure, the isolation component is damaged and the fluid is discharged from the inside of the isolation component. In this way, the fluid can be used to cool the emissions of the battery cell and reduce the risk of the emissions.

In some embodiments, the isolation component includes: a first thermally conductive plate, the first thermally conductive plate being attached to the first box; a second thermally conductive plate, the second thermally conductive plate being disposed on a side of the first thermally conductive plate away from the first box; and a first flow channel, the first flow channel being formed between the first thermally conductive plate and the second thermally conductive plate for the fluid to flow therein.

Since the isolation component includes the first thermally conductive plate and the second thermally conductive plate, and the first flow channel is formed between the first thermally conductive plate and the second thermally conductive plate, a process of manufacturing the isolation component is convenient and simple.

In some embodiments, the isolation component is provided with a through hole, the through hole is arranged opposite to the pressure relief region, and the through hole is configured for the emissions from the first box to pass through, so that the emissions enter the collection chamber.

The through hole is arranged opposite to the pressure relief region, and the emissions of the first box can pass through the through hole to enter the collection chamber, thereby making it easier for the emissions to enter the collection chamber, and reducing the possibility of the emissions entering the electrical chamber.

In some embodiments, the isolation component is configured to be capable of being damaged when the pressure relief region relieves the internal pressure, so that the emissions from the first box pass through the isolation component and enter the collection chamber.

Since the isolation component is capable of being damaged when the pressure relief region relieves the internal pressure, the emissions from the first box can pass through the isolation component to enter the collection chamber, thereby making it easier for the emissions to enter the collection chamber, and reducing the possibility of the emissions entering the electrical chamber.

In some embodiments, the isolation component is provided with a second weakened zone, the second weakened zone is arranged opposite to the pressure relief region, and the second weakened zone is configured to be capable of being damaged by the emissions from the first box, so that the emissions from the first box pass through the second weakened zone and enter the collection chamber.

By disposing the second weakened zone corresponding to the pressure relief region on the isolation component, on the one hand, when the housing of the battery cell is actuated, the emissions from the first box can pass through the second weakened zone and enter the collection chamber, which reduces the possibility of the emissions entering the electrical chamber; on the other hand, it can also ensure the isolation between the electrical chamber and the collection chamber when the housing of the battery cell is not actuated, so as to prevent the material in the collection chamber from entering the electrical chamber.

In some embodiments, a thickness of the second weakened zone is smaller than a thickness of another region of a wall where the second weakened zone is located.

Since the thickness of the second weakened zone is smaller than the thickness of another region of the wall where the second weakened zone is located, the second weakened zone is easily damaged.

In some embodiments, the thickness of the second weakened zone is 0.4 mm-3 mm.

Since the thickness of the second weakened zone is 0.4 mm-3 mm, it can be ensured that the second weakened zone will not be too thin to shorten service life, nor will it be too thick so that the second weakened zone needs to be actuated under high air pressure, that is, both the service life and the safety performance of the battery are taken into consideration.

In some embodiments, the second weakened zone has a lower melting point than another region of a wall where the second weakened zone is located.

Since the second weakened zone has a lower melting point than another region of the wall where the second weakened zone is located, the second weakened zone is easily damaged. As a result, when the temperature of the second weakened zone reaches the threshold, it can be actuated to relieve the internal pressure of the electrical chamber.

In some embodiments, a melting point of a material of the second weakened zone is lower than 600° C.

Since the melting point of the material of the second weakened zone is lower than 600° C., the second weakened zone can be damaged at a lower temperature, thereby relieving the internal pressure of the electrical chamber.

In some embodiments, the isolation component is provided with a second groove, and a bottom wall of the second groove is the second weakened zone.

By disposing the second groove on the isolation component, the bottom wall of the second groove is used as the second weakened zone, which is simple in implementation and low in cost.

In some embodiments, an opening of the second groove faces the first box.

By providing an opening on a side surface of the isolation component facing the first box to form the second groove, a larger gap can be provided between the bottom wall of the second groove and the first box, which facilitates the emissions of the first box to be discharged to the second groove.

In some embodiments, the plurality of first boxes correspond to the same isolation component.

Isolation components corresponding to the plurality of first boxes are configured as the same isolation component, which is simple in implementation and low in cost.

In some embodiments, the pressure relief region is disposed on a first wall of the first box, a first surface of the battery cell is attached to the first wall, all electrode terminals of the battery cell are disposed on a second surface, and the second surface is arranged opposite to the first surface.

The surface of the battery cell without the electrode terminal is attached to the first wall of the first box on which the pressure relief region is disposed, which can enable the emissions of the battery cell to be farther away from the electrode terminal when the housing of the battery cell is actuated, thereby reducing the influence of the emissions on the electrode terminal, and thus enhancing the safety of the battery.

In some embodiments, all the battery cells accommodated in one of the first boxes correspond to the same pressure relief region.

Pressure relief regions in the first box corresponding to all the battery cells are set to be the same, so that when the housing of a battery cell is actuated, emissions of the battery cell in the first box can be collectively discharged from the first box along one pressure relief region, thereby reducing the influence on an electrical connection component in the first box, and thus enhancing the safety of the battery. At the same time, the implementation method is simple and the cost is low.

In some embodiments, a plurality of battery cells in a single row or a single column are accommodated in the first box.

Arranging the plurality of battery cells in the first box in a single row or a single column can save the internal space of the first box.

In some embodiments, the battery further includes: a protective member, where the protective member is configured to protect the isolation component, and the collection chamber is formed between the protective member and the isolation component.

The collection chamber formed by the protective member and the isolation component can effectively collect and buffer the emissions and reduce the risk resulting therefrom. At the same time, the protective member can play a role in protecting the isolation component and prevent the isolation component from being damaged by foreign objects.

In some embodiments, the battery further includes: a sealing member, the sealing member being disposed between the isolation component and the protective member to seal the collection chamber.

The collection chamber formed by the isolation component and the protective member is set as a closed chamber by a sealing member, so that substances in the collection chamber can be blocked from entering the electrical chamber.

In a second aspect, provided is a power consumption apparatus, including the battery according to the first aspect.

In a third aspect, provided is a method for producing a battery, including: providing a plurality of battery cells, the battery cell comprising a housing, the housing being configured to be actuated when an internal pressure or temperature of the housing reaches a threshold, to relieve the internal pressure of the housing; providing a plurality of first boxes, the first box being configured to accommodate at least one battery cell of the plurality of battery cells, the first box including a pressure relief region, and the pressure relief region being configured to relieve an internal pressure of the first box; and providing a second box, the second box being configured to accommodate the plurality of first boxes.

In a fourth aspect, provided is an apparatus for producing a battery, including: a provision module configured to: provide a plurality of battery cells, a battery cell comprising a housing, the housing being configured to be actuated when an internal pressure or temperature of the housing reaches a threshold, to relieve the internal pressure of the housing; provide a plurality of first boxes, a first box being configured to accommodate at least one battery cell of the plurality of battery cells, the first box including a pressure relief region, and the pressure relief region being configured to relieve an internal pressure of the first box; and provide a second box, the second box being configured to accommodate the plurality of first boxes.

BRIEF DESCRIPTION OF THE DRAWINGS

In order to illustrate the technical solutions in embodiments of the present application more clearly, brief description will be made below to drawings required in the embodiments of the present application, and apparently, the drawings described below are some embodiments of the present application only, and other drawings could be obtained based on these drawings by those ordinary skilled in this art without creative efforts.

Figure 1:
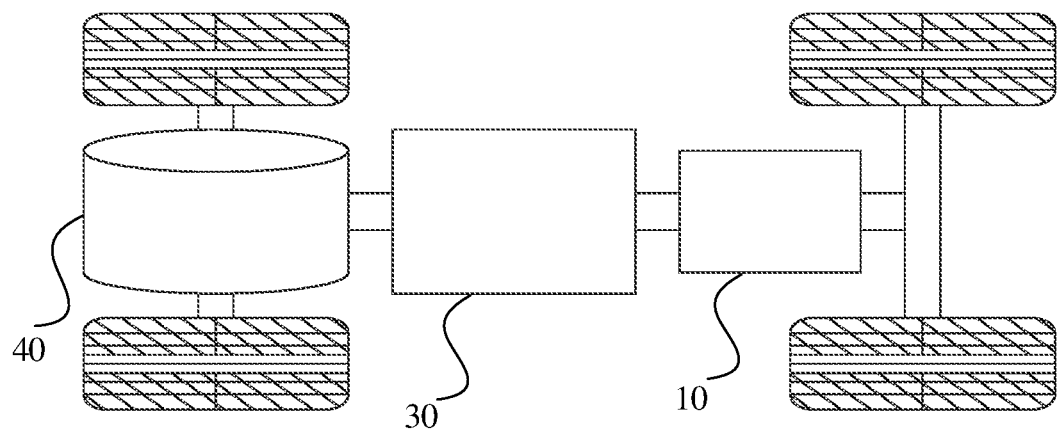
FIG. 1 is a schematic structural diagram of a vehicle disclosed in an embodiment of present application.

In the drawings, the drawings are not drawn to actual scale.

DESCRIPTION OF REFERENCE SIGNS

1—vehicle; 10—battery; 11—first box; 111—first covering; 112—first cover plate; 113—pressure relief region; 114—first wall; 1141—fourth surface; 115—first groove; 12—second box; 12a—electrical chamber; 12b—collection chamber; 121—second covering; 122—second cover plate; 123—isolation component; 1231—second weakened zone; 1232—second groove; 12321—bottom wall of second groove; 1233—first thermally conductive plate; 1234—second thermally conductive plate; 1235—first flow channel; 1236—through hole; 123a—first region; 20—battery cell; 21—first surface; 22—second surface; 23—third surface; 24—electrode assembly; 241—tab; 241a—positive tab; 241b—negative tab; 25—housing; 251—third weakened zone; 261—electrode terminal; 261a—positive electrode terminal; 261b—negative electrode terminal; 30—controller; 40—motor; 50—harness isolation plate; 60—side plate; 61—second flow channel; 310—provision module.

DESCRIPTION OF EMBODIMENTS

Implementation manners of the present application will be further described below in detail with reference to the accompanying drawings and embodiments. The detailed description of the following embodiments and the accompanying drawings are used to exemplarily illustrate principles of the present application, but cannot be used to limit the scope of the present application, that is, the present application is not limited to the described embodiments.

In the description of the present application, it should be noted that, unless otherwise provided, "a plurality of" means more than two (including two); and orientations or positional relationships indicated by terms such as "up", "down", "left", "right", "inside", and "outside" are merely for convenience of describing the present application and for simplifying the description, rather than for indicating or implying that an apparatus or element indicated must have a specific orientation, and must be constructed and operated in a specific orientation, which thus may not be understood as limitation to the present application. In addition, the terms "first", "second", and "third" are only intended for the purpose of description, and shall not be understood as an indication or implication of relative importance. "Vertical" is not strictly vertical, but within an allowable range of error. "Parallel" is not strictly parallel, but within an allowable range of error.

The orientation words appearing in the following description are all directions shown in the drawings, and do not limit the specific structure of the present application. In the description of the present application, it should be further noted that, unless explicitly specified and defined otherwise, terms "installation", "interconnection", and "connection" should be understood broadly, for example, they may either be a fixed connection, or a detachable connection, or an integrated connection; and they may either be a direct connection, or an indirect connection through an intermediary. Those of ordinary skill in the art may understand the specific meanings of the foregoing terms in the present application according to specific conditions.

In the present application, a battery cell may include a lithium-ion battery, a lithium-sulfur battery, a sodium/lithium-ion battery, a sodium-ion battery or a magnesium-ion battery, etc., which is not limited by the embodiments of the present application. The battery cell may be cylindrical, flat, cuboid or in another shape, which is also not limited by the embodiments of the present application. The battery cell is generally divided into three types according to the way of packaging: a cylindrical battery cell, a prismatic battery cell and a pouch battery cell, which are not limited by the embodiments of the present application.

The battery mentioned in the embodiments of the present application refers to a single physical module that includes one or more battery cells to provide a higher voltage and/or capacity. For example, the battery mentioned in the present application may include a battery module or a battery pack. The battery module is generally formed by one or more battery cells connected in series, in parallel or in series and parallel. The battery pack generally includes one or more battery modules, and includes a box for encapsulating the battery modules. The box can prevent liquid or other foreign matters from affecting the charging or discharging of the battery cells. The battery cell mentioned in the embodiments of the present application refers to the smallest unit module that can be independently charged and discharged.

The battery cell includes an electrode assembly and an electrolytic solution, and the electrode assembly is composed of a positive electrode sheet, a negative electrode sheet and a separator. The operation of a battery cell mainly relies on movement of metal ions between the positive electrode sheet and the negative electrode sheet. The positive electrode sheet includes a positive electrode current collector and a positive electrode active material layer. The positive electrode active material layer is coated on a surface of the positive electrode current collector, and a current collector not coated with the positive electrode active material layer protrudes from the current collector coated with the positive electrode active material layer and serves as a positive tab. In an example of a lithium-ion battery, a material of the positive electrode current collector may be aluminum, and the positive electrode active material may be lithium cobalt oxides, lithium iron phosphate, ternary lithium, lithium manganate, or the like. The negative electrode sheet includes a negative electrode current collector and a negative electrode active material layer. The negative electrode active material layer is coated on a surface of the negative electrode current collector, and a current collector not coated with the negative electrode active material layer protrudes from the current collector coated with the negative electrode active material layer and serves as a negative tab. A material of the negative electrode current collector may be copper, and the negative electrode active material may be carbon, silicon, or the like. In order to ensure that no fusing occurs when a large current passes, there are a plurality of positive tabs which are stacked together, and there are a plurality of negative tabs which are stacked together. The tab is electrically connected to an electrode terminal, and the electrode terminal generally includes a positive electrode terminal and a negative electrode terminal. A plurality of battery cells are connected in series and/or in parallel via a bus component to be applied to various applications. A material of the separator may be PP, PE, or the like. In addition, the electrode assembly may be a winding structure or a laminated structure, and the embodiments of the present application are not limited thereto.

The "battery cell" mentioned in the following is all introduced with "a pouch battery cell" as an example.

In addition to an electrode assembly and an electrolytic solution, the pouch battery cell also has a housing, and the housing may be understood as an outer packaging body, and the housing may be an aluminum-plastic film. The housing can be actuated when an internal pressure or temperature of the battery cell reaches a predetermined threshold, to relieve the internal pressure or temperature of the housing. The threshold design varies according to different design requirements. The threshold may depend on the material of one or more of the positive electrode sheet, the negative electrode sheet, the electrolytic solution and the separator in the battery cell.

The "actuated" mentioned in the present application means that the housing generates an action or is activated to a certain state, so that the internal pressure and temperature of the housing of the battery cell can be relieved. The action generated by the housing may include but be not limited to: at least a part of the housing is cracked, shattered, or torn, and so on. After the housing is actuated, high-temperature and high-pressure substances inside the battery cell will be discharged from the actuated part as emissions. In this way, the pressure and temperature of the battery cell can be relieved at a controllable pressure or temperature, thereby avoiding potentially more serious accidents.

The emissions from the battery cell mentioned in the present application include but are not limited to: an electrolytic solution, a dissolved or split positive or negative electrode sheet, fragments of a separator, a high-temperature and high-pressure gas generated by reaction, flames, or the like.

With the development of the battery technology, it is necessary to consider design factors in multiple aspects simultaneously, such as energy density, cycle life, discharge capacity, C-rate and other performance parameters. In addition, safety of the battery should also be considered.

In the current battery design solution, the main concern is to release high pressure and high heat inside a housing of a battery cell, that is, to discharge emissions to the outside of the housing of the battery cell. In addition, when the high-temperature and high-pressure emissions are discharged toward the periphery of the battery cell, the force and destructive power of such emissions may be great, which may cause other battery cells to suffer from thermal runaway as well, thereby causing further safety problems.

In view of this, the present application provides a technical solution, including accommodating a battery cell comprising a housing in a first box provided with a pressure relief region, and arranging a plurality of first boxes in a second box. Therefore, when a battery cell in a certain first box suffers from thermal runaway (after the thermal runaway occurs, an internal pressure and temperature of the battery cell rise sharply), the housing of the battery cell will be actuated when the internal pressure or temperature of the battery cell reaches a threshold, to relieve the internal pressure of the battery cell to the outside of the first box. Since the first boxes are plural in number and are independent from each other, when a battery cell in a certain first box suffers from thermal runaway, the influence of emissions and heat generated on a battery cell in other first boxes will be greatly reduced, thereby improving the safety of the battery. In addition, the first box includes a pressure relief region, which can relieve the internal pressure of the first box, thereby preventing the first box from exploding after the battery cell suffers from thermal runaway, and further improving the safety of the battery.

Technical solutions described in embodiments of the present application are all applicable to various apparatuses using batteries, such as mobile phones, portable devices, notebook computers, electromobiles, electronic toys, electric tools, electric vehicles, ships and spacecrafts. For example, the spacecrafts include airplanes, rockets, space shuttles and spaceships, and the like.

It should be understood that the technical solutions described in the embodiments of the present application are not only applicable to the devices described above, but also applicable to all devices using batteries. However, for brief description, the following embodiments are all described by an example of an electric vehicle.

For example, as shown in FIG. 1, FIG. 1 is a schematic structural diagram of a vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle, or the like. The vehicle 1 may be internally provided with a motor 40, a controller 30 and a battery 10, and the controller 30 is configured to control the battery 10 to supply power to the motor 40. For example, the battery 10 may be disposed at the bottom, head or tail of the vehicle 1. The battery 10 may be used for power supply of the vehicle 1. For example, the battery 10 may serve as an operation power source of the vehicle 1 for a circuit system of the vehicle 1, for example, for a working power demand of the vehicle 1 during startup, navigation and running. In another embodiment of the present application, the battery 10 may serve not only as an operation power source of the vehicle 1, but also as a driving power source of the vehicle 1, replacing or partially replacing fuel or natural gas to provide driving power for the vehicle 1.

The battery may be a battery module or a battery pack. The "battery" mentioned below is all introduced using the "battery pack" as an example.

Figure 2:
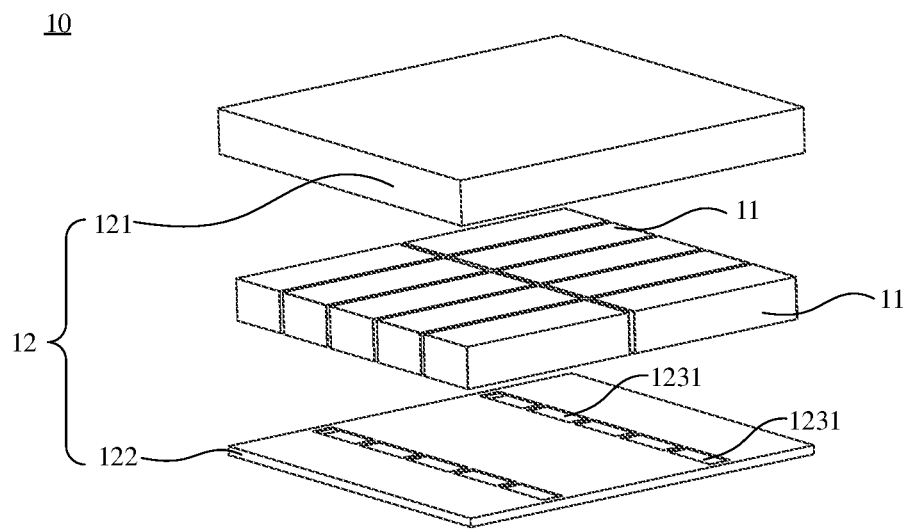
FIGS. 2 to 4 are schematic diagrams of an exploded structure of a battery disclosed in some embodiments of the present application.
Figure 3:
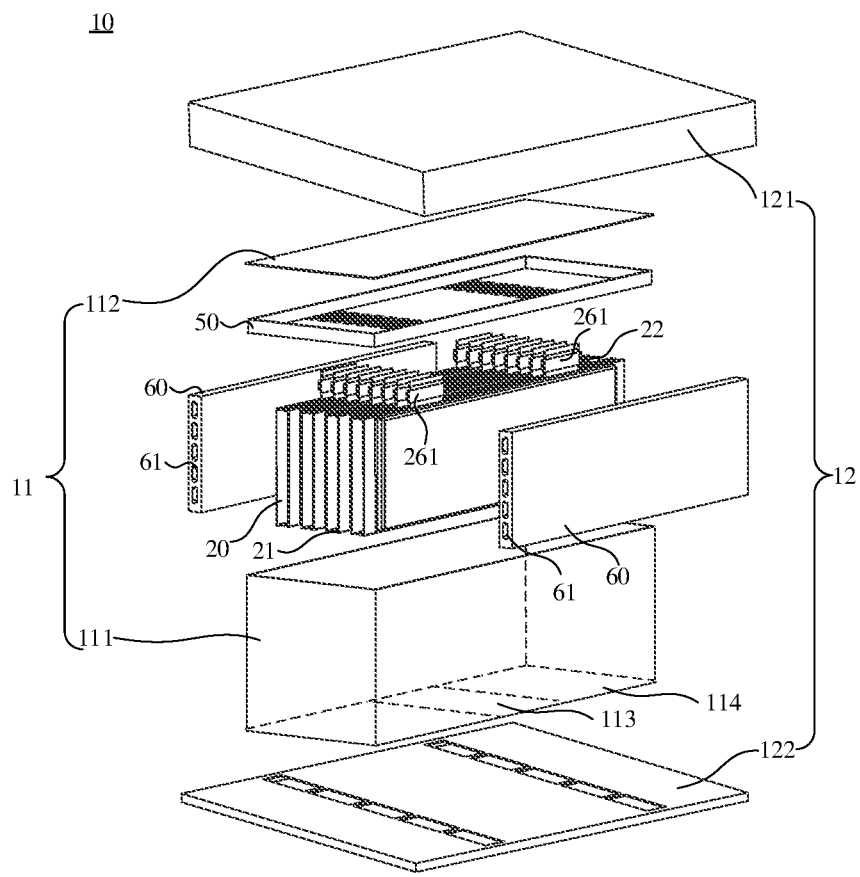
Figure 4:
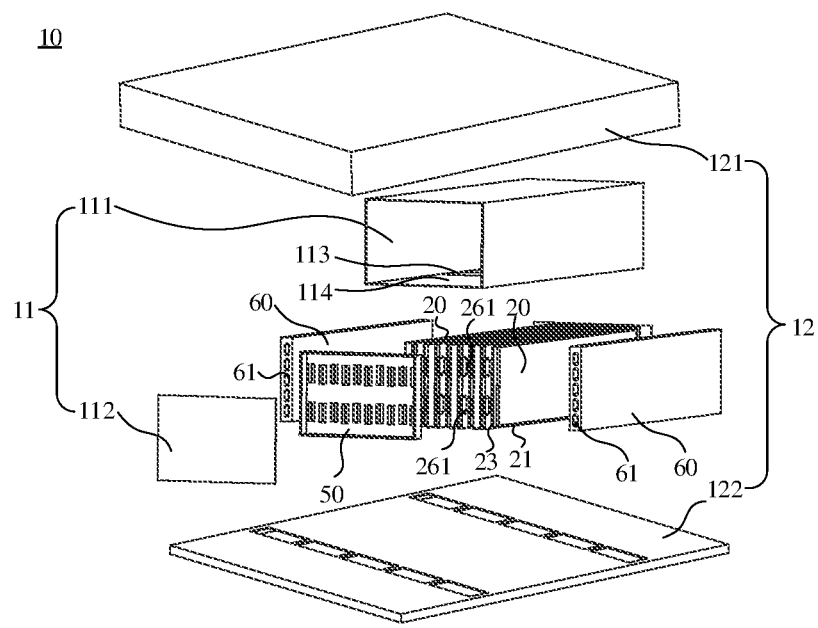

FIGS. 2 to 4 show schematic diagrams of an exploded structure of a battery 10 according to embodiments of the present application. The battery 10 may include a plurality of battery cells 20, a plurality of first boxes 11, and a second box 12 accommodating the plurality of first boxes 11. FIG. 3 and FIG. 4 only show one first box 11. The difference between FIG. 3 and FIG. 4 is that an electrode terminal 261 of a battery cell 20 is disposed at a different position.

As shown in FIGS. 2 to 4, an inside of the second box 12 is a hollow structure, and the plurality of first boxes 11 can be accommodated in the second box 12. In order to save the space of the second box 12, in some embodiments, the second box 12 can accommodate the plurality of first boxes 11 arranged in a single row or a single column. In other embodiments, the second box 12 can accommodate M×N first boxes 11, where M is the number of arrangement rows of the first boxes 11, and N is the number of arrangement columns of the first boxes 11. For example, the second box 12 accommodates 5×2 first boxes 11, that is, the first boxes 11 can be arranged in five rows, and two first boxes 11 are arranged in each row; or, the second box 12 accommodates 2×5 first boxes 11, that is, the first boxes 11 can be arranged in two rows, and five first boxes 11 are arranged in each row.

In some embodiments, the second box 12 includes a second covering 121 and a second cover plate 122, and the second covering 121 and the second cover plate 122 are fastened together. The shapes of the second covering 121 and the second cover plate 122 may be determined according to the combined shape of the plurality of first boxes 11, and the second covering 121 may have one opening. For example, the second covering 121 may be a hollow cuboid with only one surface as an opening surface, and the second cover plate 122 is fit with (or covers) an opening of the second covering 121 to form the second box 12 with a closed chamber.

According to different power requirements, the number of the battery cells 20 may be set as any value. The plurality of battery cells 20 may be connected in series, in parallel or in series and parallel to achieve larger capacity or power. Since the number of battery cells 20 included in each battery 10 may be much, the battery cells 20 may be first grouped and electrically connected, and then groups of battery cells 20 may be electrically connected, in order to facilitate installation. The number of battery cells 20 in each group is not limited and can be set according to requirements.

Figure 5:
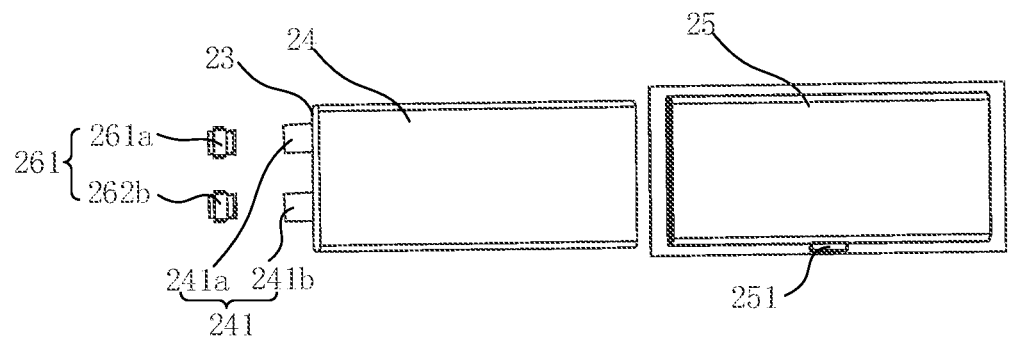
FIG. 5 is a schematic diagram of an exploded structure of a battery cell disclosed in an embodiment of the present application.

FIG. 5 is a schematic diagram of an exploded structure of a battery cell 20 provided in an embodiment of the present application. As shown in FIG. 5, the battery cell 20 includes an electrode assembly 24 and a housing 25.

When an internal pressure or temperature of the housing 25 reaches a threshold, the housing 25 is actuated to relieve the internal pressure of the housing 25. One or more electrode assemblies 24 are accommodated in a closed cavity formed by the housing 25. The housing 25 is shaped according to the combined shape of the one or more electrode assemblies 24. For example, the housing 25 may be a hollow cuboid, cube or cylinder. The housing 25 is filled with an electrolyte, such as an electrolytic solution. In some embodiments, the housing 25 may be formed of aluminum plastic film.

Optionally, as shown in FIG. 5, a third weakened zone 251 may be further disposed on the housing 25 of the battery cell 20, so that when the internal pressure or temperature of the housing 25 reaches the threshold, the third weakened zone 251 is damaged first. As a result, emissions of the battery cell 20 are discharged from the third weakened zone 251, so that the directional discharge of the emissions of the battery cell 20 is realized, and the safety performance of the battery 10 is improved.

As shown in FIG. 5, each electrode assembly 24 includes two tabs 241, and the two tabs 241 may be disposed on one surface of the electrode assembly 24. For example, the two tabs 241 may be disposed on a third surface 23 of the electrode assembly 24. The two tabs 241 may be a positive tab 241a and a negative tab 241b, respectively.

As shown in FIG. 5, the battery cell 20 further includes two electrode terminals 261, and the two electrode terminals 261 may be a positive electrode terminal 261a and a negative electrode terminal 261b, respectively.

According to actual usage requirements, one or more battery cells 20 may be accommodated in the first box 11. As shown in FIG. 3 and FIG. 4, eight battery cells 20 are accommodated in the first box 11.

When a plurality of battery cells 20 are accommodated in the first box 11, optionally, the plurality of battery cells 20 may be arranged in a single row or a single column, in order to save the internal space of the first box 11. The plurality of battery cells 20 are combined in parallel connection, series connection or series and parallel connection, and then accommodated in the first box 11.

In some embodiments, as shown in FIG. 3 and FIG. 4, the first box 11 includes a first covering 111 and a first cover plate 112, and the first covering 111 and the first cover plate 112 are fastened together to form a cavity. The shapes of the first covering 111 and the first cover plate 112 may be determined according to the combined shape of the battery cells 20, and the first covering 111 may have one opening. For example, the first covering 111 may be a hollow cuboid with only one surface as an opening surface, and the first cover plate 112 is fit with (or covers) the opening surface of the first covering 111 to form the first box 11 with a chamber.

The first box 11 is provided in plurality. In order to realize the electrical connection between a battery cell group in the first box 11 and a battery cell group in another first box 11, a channel for transmitting electric energy between the battery cell groups in the two first boxes 11 is disposed on the first boxes 11. In order to improve the sealing performance of the first box 11, a sealing member may be used to seal the channel for transmitting the electric energy. The battery cell group stands for the plurality of battery cells 20 accommodated in the first box 11.

In addition, as shown in FIG. 3 and FIG. 4, a pressure relief region 113 is disposed on the first box 11, and the pressure relief region 113 can relieve the internal pressure of the first box 11. In this way, when the battery cell 20 is actuated, emissions of the battery cell 20 is capable of being discharged from the first box 11 through the pressure relief region 113, which improves the safety performance of the battery 10.

Optionally, when the third weakened zone 251 is disposed on the housing 25 of the battery cell 20, the pressure relief region 113 on the first box 11 and the third weakened zone 251 are arranged oppositely. In this way, when the battery cell 20 is actuated, emissions of the battery cell 20 can pass through the pressure relief region 113 more easily to be discharged from the first box 11, which improves the safety performance of the battery 10.

In some embodiments, as shown in FIG. 3, the pressure relief region 113 is disposed on a first wall 114 of the first box 11, a first surface 21 of the battery cell 20 is attached to the first wall 114, two electrode terminals 261 of the battery cell 20 are both disposed on a second surface 22, and the second surface 22 is disposed opposite to the first surface 21. In other embodiments, as shown in FIG. 4, the pressure relief region 113 is disposed on a first wall 114 of the first box 11, a first surface 21 of the battery cell 20 is attached to the first wall 114, two electrode terminals 261 of the battery cell 20 are both disposed on a third surface 23, and the third surface 23 is disposed adjacent to the first surface 21.

The surface of the battery cell 20 without the electrode terminal 261 is attached to the first wall 114 of the first box 11 on which the pressure relief region 113 is disposed, which can enable the emissions of the battery cell 20 to be farther away from the electrode terminal 261 when the housing 25 of the battery cell 20 is actuated, thereby reducing the influence of the emissions on the electrode terminal 261, and thus enhancing the safety of the battery 10.

In some embodiments, one battery cell 20 may correspond to one pressure relief region 113.

In other embodiments, the plurality of battery cells 20 may correspond to the same pressure relief region 113. For example, a plurality of battery cells 20 in a single row or a single column may correspond to the same pressure relief region 113. For another example, all battery cells 20 accommodated in one first box 11 correspond to the same pressure relief region 113. Pressure relief region 113 in the first box 11 corresponding to all the battery cells 20 are set to be the same, so that when the housing 25 of a battery cell 20 is actuated, emissions of the battery cell 20 in the first box 11 can be collectively discharged from the first box 11 along one pressure relief region 113, thereby reducing the influence on an electrical connection component in the first box 11, and thus enhancing the safety of the battery 10. At the same time, the implementation method is simple and the cost is low.

Figures 6, 7:
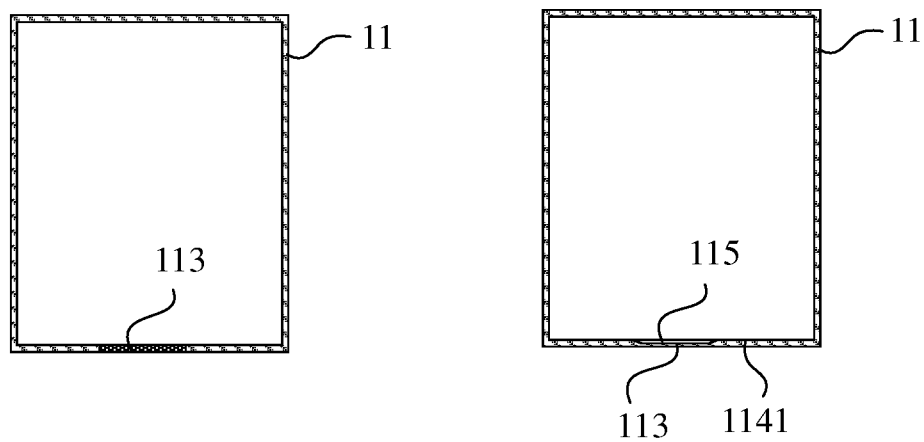
FIG. 6 and FIG. 7 are schematic cross-sectional views of a first box disclosed in some embodiments of the present application.

In some embodiments, as shown in FIG. 6, a first weakened zone is disposed on the first box 11, the first weakened zone is used as the pressure relief region 113, and the first weakened zone is configured to be actuated when an internal pressure or temperature of the first box 11 reaches a threshold, to relieve the internal pressure of the first box 11.

The battery cell 20 is accommodated in the first box 11, and the first weakened zone is disposed on the first box 11, and the first weakened zone is used as the pressure relief region 113. When an internal pressure or temperature of the first box 11 reaches a threshold, the first weakened zone is actuated, and the internal pressure of the first box 11 can be relieved through the pressure relief region 113, that is, emissions can be directed to be discharged out of the first box 11 through the pressure relief region 113 to prevent the first box 11 from exploding. At the same time, when the battery 10 is in a normal working state (the battery 10 does not suffer from thermal runaway), the first weakened zone can prevent foreign objects (such as conductive substances) from entering the first box 11, which improves the safety performance of the battery 10.

The first weakened zone may adopt various arrangements that facilitate the damage by the emissions, which is not limited by the embodiments of the present application, and will be illustrated by way of example below.

Optionally, a thickness of the first weakened zone is smaller than a thickness of another region of a wall where the first weakened zone is located. Therefore, the first weakened zone is easily damaged. At the same time, this way of forming the pressure relief region 113 is simple and convenient.

For example, the thickness of the first weakened zone is 0.4 mm-3 mm, which can ensure that the first weakened zone will not be too thin to shorten service life, nor will it be too thick so that it needs to be actuated under high air pressure, that is, both the service life and the safety performance of the battery 10 are taken into consideration.

The pressure relief region 113 may adopt a first weakened zone made of a material with a low melting point so as to be melted by the emissions. As a result, when a temperature of the first weakened zone reaches a threshold, the first weakened zone can be actuated to relieve the internal pressure of the first box 11. That is, the first weakened zone has a lower melting point than another region of a wall where the first weakened zone is located.

For example, the melting point of the material adopted in the first weakened zone is lower than 600° C. In this way, the first weakened zone can be damaged at a lower temperature, thereby relieving the internal pressure of the first box 11.

For example, FIG. 7 is a schematic cross-sectional view of a first box 11 disclosed in some embodiments of the present application. Optionally, in one embodiment, as shown in FIG. 7, a first groove 115 is disposed on the first box 11, and a bottom wall of the first groove 115 forms the first weakened zone. Since the bottom wall of the first groove 115 is weaker than another region of a wall where the first groove 115 is disposed, the bottom wall of the first groove 115 is easily damaged by the emissions. After the housing 25 is actuated, the emissions can damage the bottom wall of the first groove 115 and be discharged out of the first box 11, which is simple in implementation and low in cost.

Optionally, as shown in FIG. 7, the first groove 115 is disposed on a fourth surface 1141 of the first box 11 facing the battery cell 20. That is, an opening of the first groove 115 faces the battery cell 20.

By providing an opening on a side surface of the first box 11 facing the battery cell 20 to form the first groove 115, a larger gap can be provided between the bottom wall of the first groove 115 and the battery cell 20, which facilitates the emissions of the battery cell 20 to be discharged to the first groove 115.

It should be understood that the opening of the first groove 115 may also face away from the battery cell 20. In this case, the bottom wall of the first groove 115 is also easily damaged by the emissions.

Figure 8:
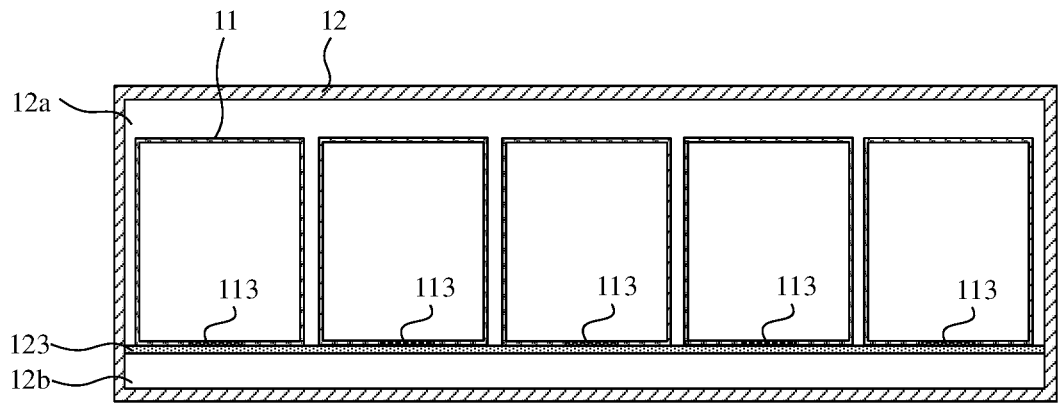
FIGS. 8-13 are schematic cross-sectional views of a combined structure of a first box and a second box disclosed in some embodiments of the present application.

FIG. 8 shows a schematic cross-sectional view of a combined structure of a first box 11 and a second box 12 disclosed in an embodiment of the present application. As shown in FIG. 8, the second box 12 includes an electrical chamber 12a, a collection chamber 12b and an isolation component 123. One or more first boxes 11 may be accommodated in the electrical chamber 12a. The collection chamber 12b is configured to collect emissions from the first box 11. The isolation component 123 can isolate the electrical chamber 12a and the collection chamber 12b, so that the electrical chamber 12a and the collection chamber 12b are disposed on both sides of the isolation component 123. The so-called "isolation" here refers to separation, which does not need to be completely sealed.

The isolation component 123 is utilized to separate the electrical chamber 12a for accommodating the first box 11 and the collection chamber 12b for collecting the emissions. When the housing 25 of the battery cell 20 in the first box 11 is actuated, the emissions of the battery cell 20 enter the collection chamber 12b, so that the emissions do not enter or enter the electrical chamber 12a in a small amount, thereby achieving separation of the emissions from the battery cell 20, reducing the influence of the emissions of the battery cell 20 (the emissions contain gases, combustibles, metal chips and other substances) on an electrical connection component, preventing the emissions of the battery cell 20 from causing a short circuit between the battery cells 20, and thus enhancing the safety of the battery 10.

In some embodiments, in order to facilitate the installation of the second box 12, the plurality of first boxes 11 may correspond to the same isolation component 123, that is, isolation components 123 corresponding to the plurality of first boxes 11 are configured as the same isolation component 123, which is simple in implementation and low in cost. For example, a plurality of first boxes 11 arranged in a single row or a single column may correspond to the same isolation component 123. For another example, all the first boxes 11 in the second box 12 may correspond to the same isolation component 123.

Figure 9:
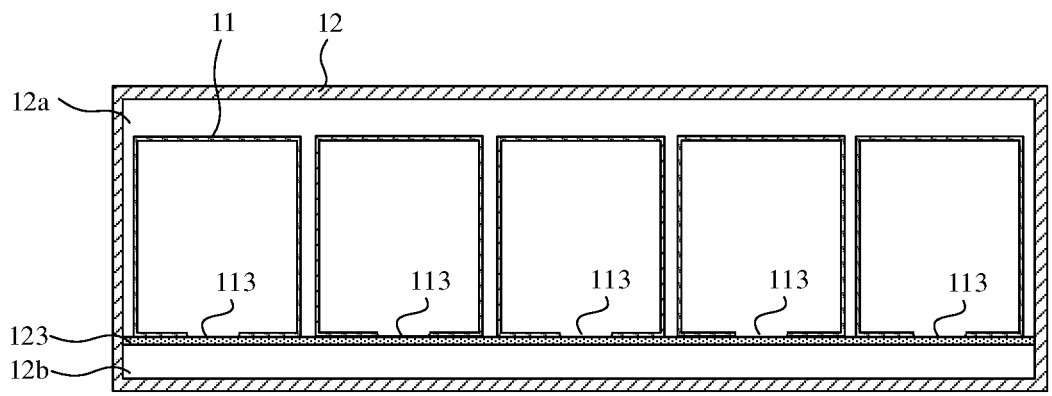

FIG. 9 shows a schematic cross-sectional view of another combined structure of a first box 11 and a second box 12 disclosed in an embodiment of the present application.

In other embodiments, as shown in FIG. 9, the first box 11 may also be a covering with an opening. In this case, the opening forms the pressure relief region 113, and thus the internal pressure in the first box 11 can be relieved through the opening, thereby preventing the first box 11 from exploding, and improving the safety performance of the battery 10. Optionally, as shown in FIG. 9, the isolation component 123 may be fit with (or cover) the opening of the first box 11. By covering the opening of the first box 11 by the isolation component 123, substances in the collection chamber 12b can be blocked from entering the electrical chamber 12a.

Optionally, the isolation component 123 is configured to be capable of being damaged when the pressure relief region 113 relieves the internal pressure of the first box 11, so that the emissions from the first box 11 pass through the isolation component 123 and enter the collection chamber 12b.

In some embodiments, the pressure relief region 113 on the first box 11 faces the isolation component 123, so that the emissions can directly rush to the isolation component 123 when the pressure relief region 113 relieves the internal pressure of the first box 11, thereby making it easier for the emissions from the first box 11 to enter the collection chamber 12b, and reducing the possibility of the emissions entering the electrical chamber 12a.

Figure 10:
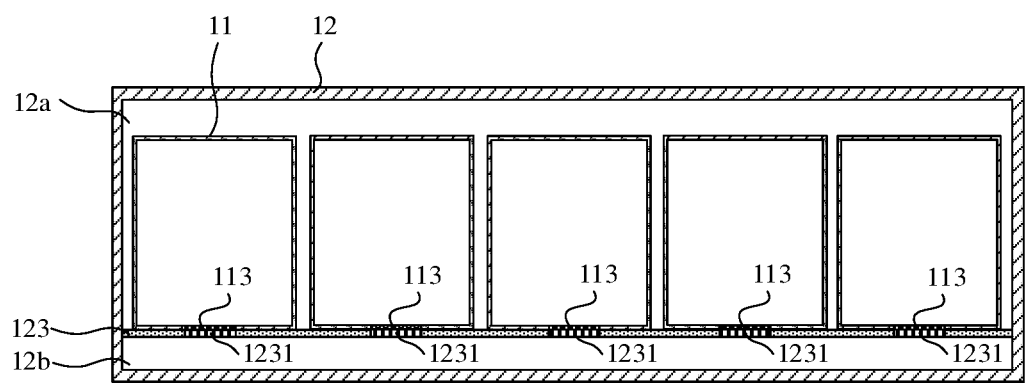
Figure 11:
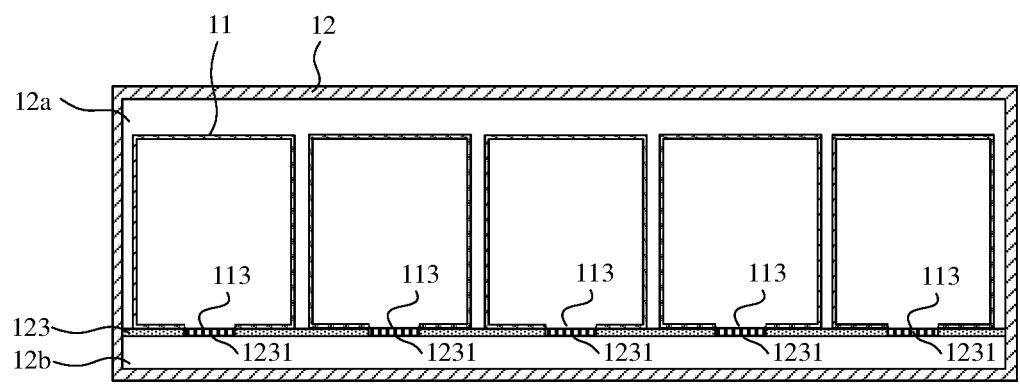

FIG. 10 and FIG. 11 respectively show schematic cross-sectional views of yet another combined structure of a first box 11 and a second box 12 disclosed in embodiments of the present application. In some embodiments, as shown in FIG. 10 and FIG. 11, a second weakened zone 1231 may be disposed on the isolation component 123, the second weakened zone 1231 and the pressure relief region 113 are arranged oppositely, and the second weakened zone 1231 is capable of being damaged when the pressure relief region 113 relieves the internal pressure, so that the emissions from the first box 11 pass through the isolation component 123 and enter the collection chamber 12b. The difference between FIG. 10 and FIG. 11 is that the first box 11 in FIG. 11 has an opening.

By disposing the second weakened zone 1231 corresponding to the pressure relief region 113 on the isolation component 123, on the one hand, when the housing 25 of the battery cell 20 is actuated, the emissions from the first box 11 can pass through the second weakened zone 1231 and enter the collection chamber 12b, which reduces the possibility of the emissions entering the electrical chamber 12a; on the other hand, it can also ensure the isolation between the electrical chamber 12a and the collection chamber 12b when the housing 25 of the battery cell 20 is not actuated, so as to prevent the material in the collection chamber 12b from entering the electrical chamber 12a.

In some embodiments, one first box 11 may correspond to one second weakened zone 1231. For example, as shown in FIG. 2, the second cover plate 122 may be an isolation component 123, and one first box 11 corresponds to a second weakened zone 1231 disposed on the second cover plate 122. In other embodiments, a plurality of first boxes 11 in a single row or a single column may correspond to one second weakened zone 1231. By setting the second weakened zones 1231 of the plurality of first boxes 11 in a single row or a single column to be the same, the emissions of the battery cells 20 in the first box 11 can be collectively discharged along one second weakened zone 1231, thereby reducing the influence on an electrical connection component in the first box 11, and thus enhancing the safety of the battery 10. At the same time, the implementation method is simple and the cost is low.

The second weakened zone 1231 may adopt various arrangements that facilitate the damage by the emissions, which is not limited by the embodiments of the present application, and will be illustrated by way of example below.

Optionally, a thickness of the second weakened zone 1231 is smaller than a thickness of another region of a wall where the second weakened zone 1231 is located. For example, the thickness of the second weakened zone 1231 is 0.4 mm-3 mm. In this way, it can be ensured that the second weakened zone 1231 will not be too thin to shorten service life, nor will it be too thick so that it needs to be actuated under high air pressure, that is, both the service life and the safety performance of the battery 10 are taken into consideration.

In addition to adopting the second weakened zone 1231 with a smaller thickness, a second weakened zone 1231 made of a material with a low melting point may also be adopted so as to be melted by the emissions. In other words, the second weakened zone 1231 has a lower melting point than another region of a wall where the second weakened zone 1231 is located. In this way, the second weakened zone 1231 is easily damaged, so that when a temperature of the second weakened zone 1231 reaches a threshold, the second weakened zone 1231 can be actuated to relieve the internal pressure of the electrical chamber 12a.

For example, the melting point of the material adopted in the second weakened zone 1231 is lower than 600° C. In this way, the second weakened zone 1231 can be damaged at a lower temperature, thereby relieving the internal pressure of the electrical chamber 12a.

Figure 12:
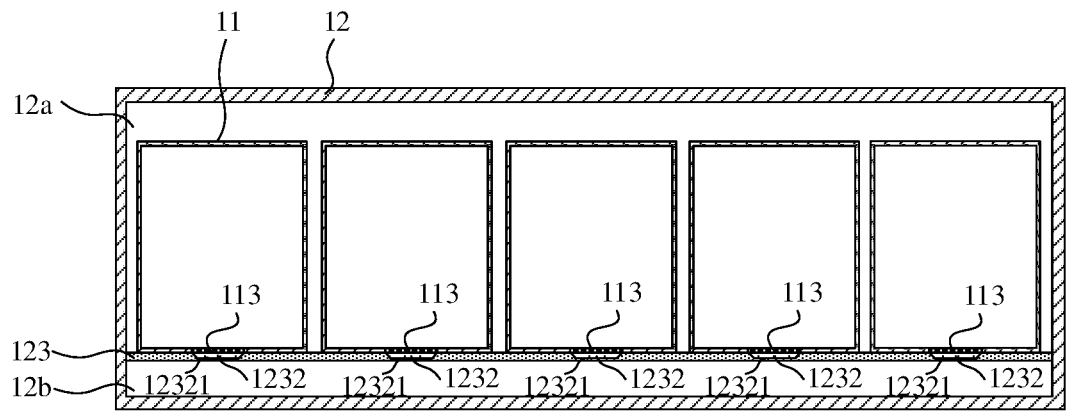
Figure 13:
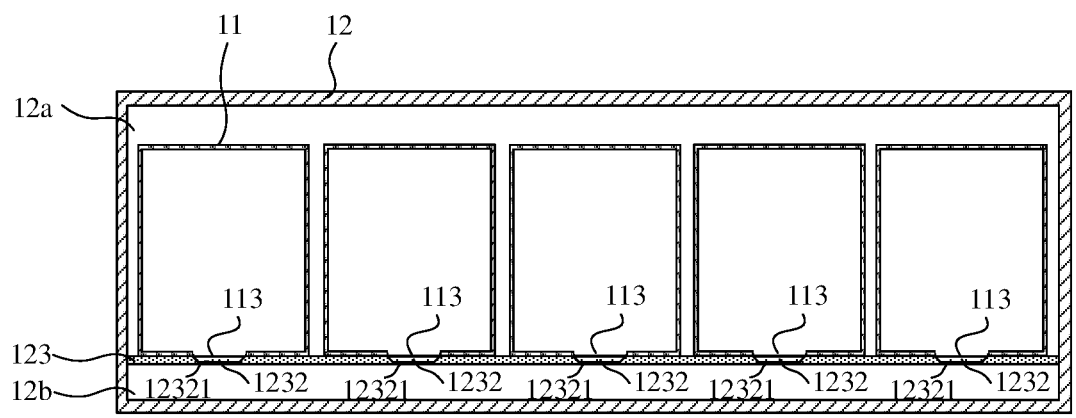

FIG. 12 and FIG. 13 respectively show schematic cross-sectional views of yet another combined structure of a first box 11 and a second box 12 disclosed in embodiments of the present application. Optionally, in one embodiment, as shown in FIG. 12 and FIG. 13, a second groove 1232 is disposed on the isolation component 123, and a bottom wall 12321 of the second groove 1232 forms the second weakened zone 1231. Since the bottom wall 12321 of the second groove 1232 is weaker than another region of a wall where the second groove 1232 is disposed, the bottom wall 12321 of the second groove 1232 is easily damaged by the emissions. When the housing 25 is actuated, the emissions can damage the bottom wall 12321 of the second groove 1232, and enter the collection chamber 12b, which is simple in implementation and low in cost. The difference between FIG. 12 and FIG. 13 is that the first box 11 in FIG. 13 has an opening.

Optionally, the second groove 1232 is disposed on a surface of the isolation component 123 facing the first box 11. In other words, an opening of the second groove 1232 faces the first box 11. In this way, a larger gap can be provided between the bottom wall of the second groove 1232 and the first box 11, which facilitates the emissions from the first box 11 to be discharged to the second groove 1232.

It should be understood that the opening of the second groove 1232 may also face away from the first box 11. In this case, the bottom wall of the second groove 1232 is also easily damaged by the emissions.

In other embodiments, the second weakened zone 1231 may be replaced by a through hole, that is, the through hole is arranged opposite to the pressure relief region 113, and the emissions from the first box 11 is capable of entering the collection chamber 12b through the through hole, thereby reducing the possibility of the emissions entering the electrical chamber 12a.

Optionally, a fluid is accommodated in the isolation component 123 to adjust a temperature of the battery cell 20.

Specifically, when the pressure relief region 113 relieves the internal pressure, the isolation component 123 is capable of being damaged, so that the fluid in the isolation component 123 is discharged from the inside of the isolation component 123, which can absorb the heat of the battery cell 20, reduce the temperature of the emissions, and further, reduce the risk of the emissions. In this case, the fluid enters the collection chamber 12b together with the emissions cooled by the fluid. Due to the cooling by the fluid, the temperature of the emissions from the battery cell 20 can be quickly reduced, and thus the risk of the emissions entering the collection chamber 12b is greatly reduced. In addition, the emissions do not have great influence on other parts of the battery 10, such as other battery cells 20, so that the destructiveness caused by the abnormality of the battery cell 20 in the first box 11 can be suppressed as soon as possible, and the possibility of explosion of the battery 10 can be reduced.

In some embodiments, the isolation component 123 may include a fluid channel made of a thermally conductive material. The fluid flows in the flow channel and conducts heat through the thermally conductive material to lower the temperature of the battery cell 20. Optionally, the second weakened zone 1231 on the isolation component 123 may include only a thermally conductive material but no fluid to form a thinner thermally conductive material layer so as to be easily damaged by the emissions. For example, the bottom wall 12321 of the second groove 1232 may be a thin thermally conductive material layer to form the second weakened zone 1231.

Figure 14:
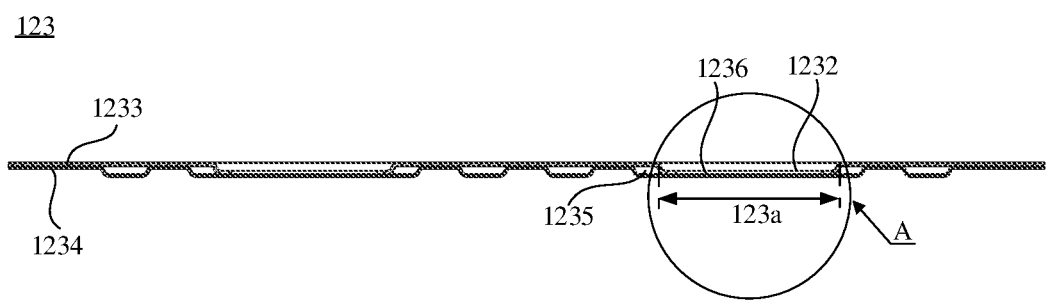
FIG. 14 is a schematic structural diagram of an isolation component disclosed in an embodiment of the present application.
Figure 15:
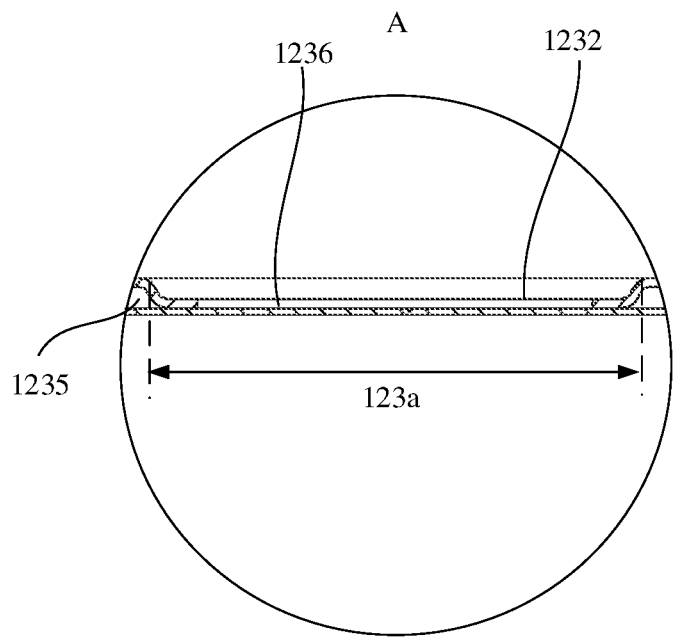
FIG. 15 is a schematic diagram of an enlarged structure of part A of the isolation component shown in FIG. 14.

FIG. 14 is a schematic structural diagram of an isolation component 123 disclosed in an embodiment of the present application. Optionally, in some embodiments, as shown in FIG. 14, the isolation component 123 may include a first thermally conductive plate 1233 and a second thermally conductive plate 1234. The first thermally conductive plate 1233 and the second thermally conductive plate 1234 form a first flow channel 1235 for accommodating a fluid. The first thermally conductive plate 1233 is attached to the first box 11. FIG. 15 is a schematic diagram of an enlarged structure of part A of the isolation component 123 shown in FIG. 14. As shown in FIG. 15, a first region 123a of the first thermally conductive plate 1233 is recessed toward the second thermally conductive plate 1234 to form a second groove 1232, and the first region 123a is connected to the second thermally conductive plate 1234. In this way, the first flow channel 1235 is formed around the second groove 1232, and there is no first flow channel 1235 in the bottom wall of the second groove 1232, so that the second weakened zone 1231 is formed. Since the isolation component 123 includes the first thermally conductive plate 1233 and the second thermally conductive plate 1234, and the first flow channel 1235 is formed between the first thermally conductive plate 1233 and the second thermally conductive plate 1234, a process of manufacturing the isolation component 123 is enabled to be convenient and simple.

Optionally, the first thermally conductive plate 1233 or the second thermally conductive plate 1234 at the bottom wall of the second groove 1232 may also be removed to form a thinner weakened zone. For example, as shown in FIG. 14, the first region 123a is provided with a through hole 1236, and a radial size of the through hole 1236 is smaller than a radial size of the second groove 1232, that is, removing the first thermally conductive plate 1233 at the bottom wall of the second groove 1232, and maintaining the connection between the first thermally conductive plate 1233 and the second thermally conductive plate 1234 at the bottom edge of the second groove 1232, so as to form the first flow channel 1235 around the second groove 1232.

Optionally, the second thermally conductive plate 1234 corresponding to the through hole 1236 may also be thinned, that is, a thickness of the second thermally conductive plate 1234 corresponding to the through hole 1236 is smaller than a thickness of the second thermally conductive plate 1234 in another region, so that the weakened zone is more easily damaged by the emissions. Optionally, a weakened groove may further be disposed on the second thermally conductive plate 1234 corresponding to the through hole 1236.

Optionally, in some embodiments, the battery 10 further includes a protective member, where the protective member is configured to protect the isolation component 123, and the collection chamber 12b may be formed by the isolation component 123 and the protective member. In some embodiments, the protective member may constitute a part of a wall of the second box 12.

The collection chamber 12b formed by the protective member and the isolation component 123 does not occupy the space in which the battery cells 20 may be accommodated. Therefore, the collection chamber 12b with a larger space can be configured, which can effectively collect and buffer the emissions and reduce the risk resulting therefrom. At the same time, the protective member can play a role in protecting the isolation component 123 and prevent the isolation component 123 from being damaged by foreign objects.

Optionally, in some embodiments of the present application, a fluid such as a cooling medium, or a component for accommodating the fluid, may be further provided in the collection chamber 12b, so as to further lower the temperature of the emissions entering the collection chamber 12b.

Optionally, in some embodiments, the collection chamber 12b may be a sealed chamber. For example, a connection between the protective member and the isolation component 123 may be sealed by a sealing member. The collection chamber 12b formed by the isolation component 123 and the protective member is set as a closed chamber by a sealing member, so that substances in the collection chamber 12b can be blocked from entering the electrical chamber 12a.

Optionally, the battery 10 may further include other structures, which will not be described in detail herein. For example, as shown in FIG. 3 and FIG. 4, the battery 10 may further include a harness isolation plate 50 accommodated in the first box 11, and the harness isolation plate 50 is configured to install a bus component. The bus component is configured to realize the electrical connection between a plurality of battery cells 20, such as parallel connection or series connection or series and parallel connection. For another example, as shown in FIG. 3 and FIG. 4, the battery 10 may further include a side plate 60 accommodated in the first box 11, and the side plate 60 may be arranged around the battery cell 20. The side plate 60 may be provided with a second flow channel 61, and the second flow channel 61 may accommodate a fluid to adjust the temperature of the battery cell 20.

An embodiment of the present application further provides a power consumption apparatus, and the power consumption apparatus may include the battery 10 in each of the foregoing embodiments. Optionally, the power consumption apparatus may be a vehicle 1, a ship or a spacecraft.

The battery 10 and the power consumption apparatus according to the embodiments of the present application are described above, and a method and apparatus for producing a battery according to embodiments of the present application will be described below. For the parts not described in detail, reference can be made to the foregoing embodiments.

Figure 16:
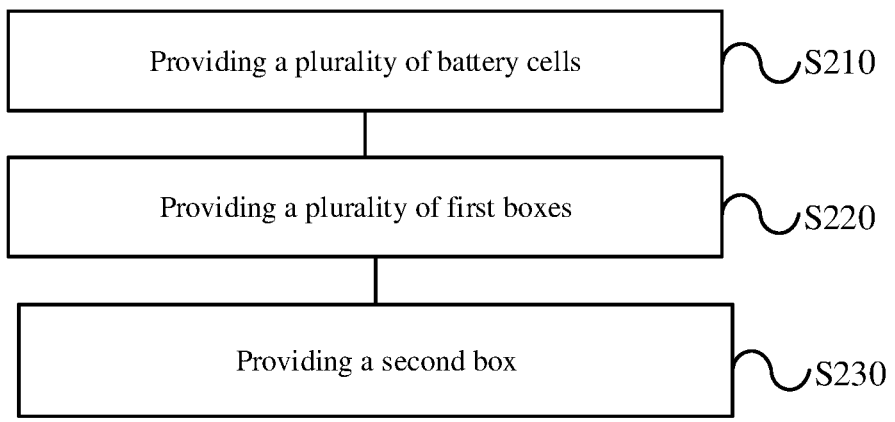
FIG. 16 is a schematic flowchart of a method for producing a battery according to an embodiment of the present application.

FIG. 16 shows a schematic flowchart of a method 200 for producing a battery according to an embodiment of the present application. As shown in FIG. 16, the method 200 may include:

S210, providing a plurality of battery cells, the battery cell comprising a housing, the housing being configured to be actuated when an internal pressure or temperature of the housing reaches a threshold, to relieve the internal pressure of the housing;

S220, providing a plurality of first boxes, the first box being configured to accommodate at least one battery cell of the plurality of battery cells, the first box including a pressure relief region, and the pressure relief region being configured to relieve an internal pressure of the first box; and S230, providing a second box, the second box being configured to accommodate the plurality of first boxes.

Figure 17:
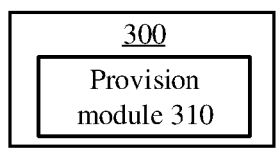
FIG. 17 is a schematic block diagram of an apparatus for producing a battery according to an embodiment of the present application.

FIG. 17 shows a schematic block diagram of an apparatus 300 for producing a battery according to an embodiment of the present application. As shown in FIG. 17, the apparatus 300 for producing the battery may include a provision module 310.

The provision module 310 is configured to: provide a plurality of battery cells, the battery cell comprising a housing, the housing being configured to be actuated when an internal pressure or temperature of the housing reaches a threshold, to relieve the internal pressure of the housing; provide a plurality of first boxes, the first box being configured to accommodate at least one battery cell of the plurality of battery cells, the first box including a pressure relief region, and the pressure relief region being configured to relieve an internal pressure of the first box; and provide a second box, the second box being configured to accommodate the plurality of first boxes.

Although the present application has been described with reference to the preferred embodiments, various improvements may be made to the present application and the components therein may be replaced with equivalents without departing from the scope of the present application. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A battery, comprising:
a plurality of battery cells;
a plurality of first boxes, a first box being configured to accommodate at least one battery cell of the plurality of battery cells; and
a second box, the second box being configured to accommodate the plurality of first boxes, wherein the second box comprises an electrical chamber, a collection chamber and an isolation component, and the electrical chamber is configured to accommodate the plurality of first boxes, the collection chamber is configured to collect emissions from the first box, and the isolation component is configured to isolate the electrical chamber and the collection chamber, so that the electrical chamber and the collection chamber are disposed on both sides of the isolation component.

2. The battery according to claim 1, wherein the first box comprising a pressure relief region, and the pressure relief region being configured to relieve an internal pressure of the first box.

3. The battery according to claim 2, wherein the pressure relief region faces the isolation component.

4. The battery according to claim 3, wherein the first box is a covering with an opening, the opening forms the pressure relief region, and the isolation component covers the opening.

5. The battery according to claim 3, wherein the first box has a cavity for accommodating the battery cell, the pressure relief region is a first weakened zone of the first box, and the first weakened zone is configured to be actuated when an internal pressure or temperature of the cavity reaches a threshold, to relieve the internal pressure of the cavity.

6. The battery according to claim 5, wherein a thickness of the first weakened zone is smaller than a thickness of another region of a wall where the first weakened zone is located, and the thickness of the first weakened zone is 0.4 mm-3 mm.

7. The battery according to claim 5, wherein the first weakened zone has a lower melting point than another region of a wall where the first weakened zone is located, and a melting point of a material of the first weakened zone is lower than 600° C.

8. The battery according to claim 5, wherein the first box is provided with a first groove, and a bottom wall of the first groove is the first weakened zone, and an opening of the first groove faces the battery cell.

9. The battery according to claim 2, wherein the isolation component is configured to accommodate a fluid to adjust a temperature of the battery cell, and the isolation component is configured to be capable of being damaged when the pressure relief region relieves the internal pressure, so that the fluid is discharged from an inside of the isolation component.

10. The battery according to claim 2, wherein the isolation component is provided with a through hole, the through hole is arranged opposite to the pressure relief region, and the through hole is configured for the emissions from the first box to pass through, so that the emissions enter the collection chamber.

11. The battery according to claim 2, wherein the isolation component is configured to be capable of being damaged when the pressure relief region relieves the internal pressure, so that the emissions from the first box pass through the isolation component and enter the collection chamber.

12. The battery according to claim 11, wherein the isolation component is provided with a second weakened zone, the second weakened zone is arranged opposite to the pressure relief region, and the second weakened zone is configured to be capable of being damaged by the emissions from the first box, so that the emissions from the first box pass through the second weakened zone and enter the collection chamber.

13. The battery according to claim 12, wherein a thickness of the second weakened zone is smaller than a thickness of another region of a wall where the second weakened zone is located, and the thickness of the second weakened zone is 0.4 mm-3 mm.

14. The battery according to claim 13, wherein the second weakened zone has a lower melting point than another region of a wall where the second weakened zone is located, and a melting point of a material of the second weakened zone is lower than 600° C.

15. The battery according to claim 13, wherein the isolation component is provided with a second groove, and a bottom wall of the second groove is the second weakened zone, and an opening of the second groove faces the first box.

16. The battery according to claim 2, wherein the pressure relief region is disposed on a first wall of the first box, a first surface of the battery cell is attached to the first wall, all electrode terminals of the battery cell are disposed on a second surface, and the second surface is arranged opposite to the first surface.

17. The battery according to claim 2, wherein all the battery cells accommodated in one of the first boxes correspond to a same pressure relief region.

18. The battery according to claim 1, wherein the plurality of first boxes correspond to a same isolation component.

19. The battery according to claim 1, wherein the battery further comprises:
   a protective member, wherein the protective member is configured to protect the isolation component, and the collection chamber is formed between the protective member and the isolation component.

20. The battery according to claim 19, wherein the battery further comprises:
   a sealing member, the sealing member being disposed between the isolation component and the protective member to seal the collection chamber.

* * * * *